Patented Dec. 18, 1923.

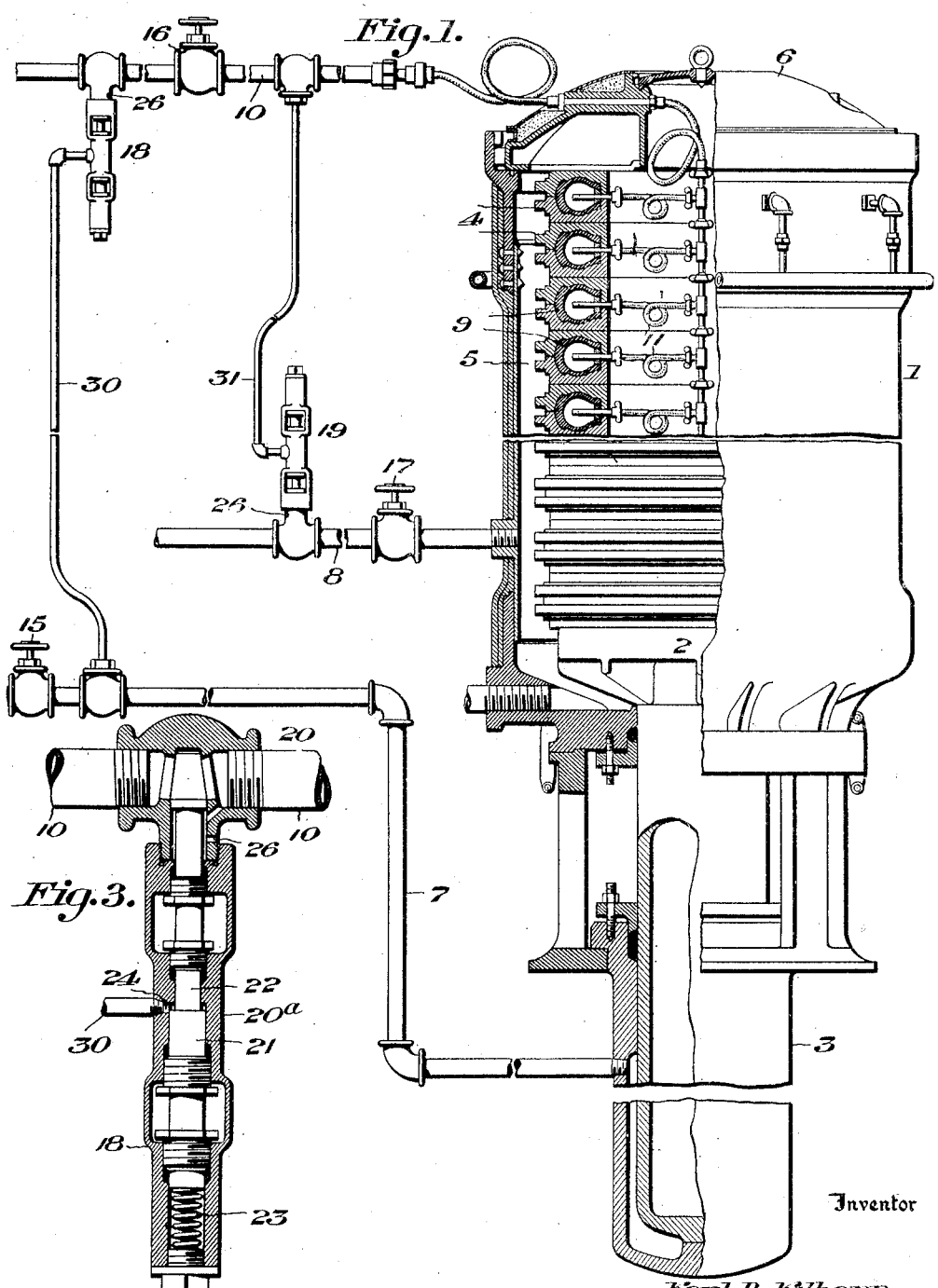

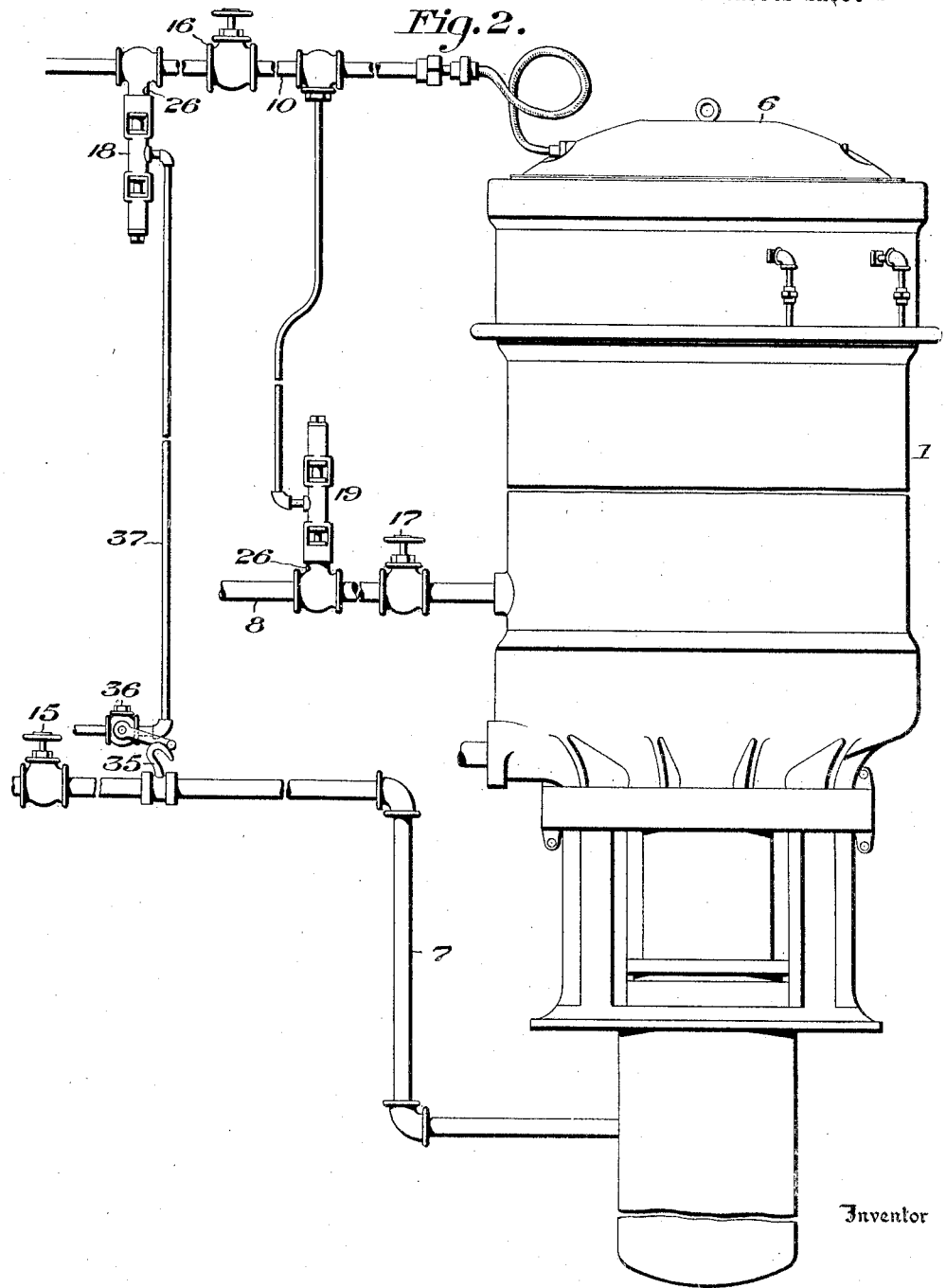

1,477,879

UNITED STATES PATENT OFFICE.

KARL B. KILBORN AND WALTER E. SHIVELY, OF AKRON, OHIO, ASSIGNORS TO THE GOODYEAR TIRE & RUBBER COMPANY, OF AKRON, OHIO, A CORPORATION OF OHIO.

SYSTEM OF CONTROL FOR VULCANIZERS.

Application filed December 30, 1921. Serial No. 525,847.

*To all whom it may concern:*

Be it known that we, KARL B. KILBORN and WALTER E. SHIVELY, citizens of the United States, residing at Akron, in the county of Summit and State of Ohio, have invented new and useful Improvements in Systems of Control for Vulcanizers, of which the following is a specification.

Our invention relates to hydraulic press vulcanizers, and it particularly contemplates a system of control for such vulcanizers which establishes a definite sequence of application of the hydraulic pressure, the pneumatic pressure for inflating the articles contained within the vulcanizers, and the heating fluid that serves to heat the chamber of the vulcanizers.

Vulcanizers of this general type customarily comprise an hydraulic ram between the platens of which the mold forms containing the articles to be vulcanized, are assembled and maintained in mating relation by the pressure from the ram. In the vulcanization of hollow objects, such as pneumatic tires, the article is inflated to expand it into the molding cavity of the mold members. The heat for vulcanizers of this general type is supplied by steam that is admitted to the vulcanizing chamber, and it has heretofore been proposed to render the supply of steam to the heating chamber dependent upon the hydraulic pressure that is applied to the press.

The failure of the hydraulic pressure during the vulcanizing operation results in the unseating of the mold sections by the pneumatic pressure in the encased articles. Since the material of the article is in a semi-plastic state during vulcanization, the unseating of the mold sections destroys the articles being vulcanized or renders them unfit for commercial use. If, on the other hand, the inflating pressure fails, the cure is completed with the objects in a deflated condition which either impairs or destroys their usefulness. It is, therefore, highly desirable that the supply of steam to the press be responsive to both the pneumatic pressure and the hydraulic pressure employed in the vulcanizer.

Our invention contemplates means for supplying hydraulic and pneumatic pressure and heating fluid to the press which precludes the operation of the various sources of supply except in a prescribed sequence, and it also contemplates a system of control that automatically releases the heating fluid from the vulcanizing chamber when either the air or the hydraulic pressure fails.

In order to obtain this desirable sequence of control, we render the supply of pneumatic pressure, which inflates the objects contained within the molds, dependent upon the hydraulic pressure and we also render the supply of heating fluid, which is usually steam, dependent upon the pneumatic pressure.

Figures 1 and 2 of the accompanying drawings are diagrammatic views of a vulcanizing apparatus connected in accordance with our invention; and Figure 3 is an elevational view, shown partially in section with parts broken away, of a valve mechanism employed in the system.

The vulcanizing apparatus 1 may be of any suitable design in which an hydraulic plunger 2, which is mounted within a pressure cylinder 3, is adapted to maintain the molds 4 in mated relation. The chamber 5 of the vulcanizer has a removable head 6 through which the molds 4 are admitted to the vulcanizing chamber.

A pipe 7 communicates hydraulic pressure to the cylinder 3. Steam for heating the chamber 5 is supplied through pipe 8, and pressure for inflating the articles 9, that are shown as encased within the mold sections 4, is supplied from an air line 10 having radiating connections 11 that communicate with the articles being vulcanized.

Fig. 1 illustrates a system in which the several elements, air and steam, are controlled from the source of hydraulic pressure. Hand valves 15, 16 and 17 are placed in each of the supply pipes 7, 10 and 8 to manually control the connection between the respective sources of supply and the vulcanizer. Automatically operated valves 18 and 19, preferably of the design shown in Fig. 3, respectively control the air and steam that is supplied to the vulcanizer. Any suitable form of automatic or manual valves may be employed since their specific form is not a part of our invention.

Fig. 3 illustrates an automatic valve that may be employed in our system of control embodying a fluid valve 20 that is controlled from a piston 21 through a shaft 22. The operating mechanism for the valve 20 is mounted in a casing 20ᵃ. A spring 23 maintains the valve 20 in its closed position until it is actuated by pressure applied to the piston 21 through a supply port 24. The valve 20 is of such a type that it establishes an exhaust for the fluid through port 26 when the valve is closed.

A communication is established from the hydraulic supply pipe 7 to the automatic valve 18 through a pipe 30 and a corresponding connection 31 extends from the air supply pipe 10 to the automatic valve 19.

The operation of the system, as illustrated in Fig. 1, may best be understood by assuming that the hand valves 15, 16 and 17 are initially closed. Hydraulic pressure is supplied to the cylinder 3 by opening the valve 15. The pressure that is communicated to the valve 18 through the connecting tube 30 opens the valve 18 and establishes a connection through the pressure line to the hand valve 16 when a predetermined pressure obtains in the hydraulic line 7. When the valve 16 is opened, air pressure is admitted to the objects 9 that are contained within the vulcanizer. The valve 18 is so constructed, however, that it will not open until the pressure within the hydraulic supply pipe 7 increases to a predetermined value. This pressure, at which the valves 18 and 19 operate, is regulated by the spring 23 of the valve. The initial rush of fluid through the pipes 7 and 10 so reduces the pressure within the communicating tubes 30 and 31 that the corresponding valves are not actuated until the molds are in their mated relation and the articles inflated to a predetermined pressure. After the air pressure through the pipe 10 is established, the valve 19 is automatically opened to establish connection to the source of steam supply. When the valve 17 is opened, the steam is admitted to the heating chamber of the vulcanizer.

From the above relations it will be understood that failure of either the hydraulic pressure or the air pressure closes the corresponding automatic valve to thereby arrest the supply of steam to the vulcanizer. If the inflating pressure alone fails, the steam supply is arrested but the hydraulic pressure through the main 7 is maintained.

In view of the extreme pressures that are at times employed in the hydraulic lines of vulcanizers of this general class, it may be desirable, under certain circumstances, to introduce an auxiliary system of control. Such a system is illustrated in Fig. 2 in which the various elements of the vulcanizer are numbered to correspond to the elements shown in Fig. 1.

The system shown in Fig. 2 is the same as that illustrated in Fig. 1 with the exception that indirect control of the valve 18 is employed in lieu of the direct control indicated in Fig. 1. In apparatus of this general class, hydraulic pressure of 1200 pounds per square inch is often employed and it is difficult to construct a valve that will operate satisfactorily on this enormous pressure head.

Bourdon springs, such as are frequently employed in pressure measuring instruments, such as hydraulic gauges, develop sufficient energy at this pressure to operate an auxiliary control valve. Such a spring 35 is indicated as connected to the supply pipe 7 and is shown in diagrammatic form. As the pressure in the supply pipe increases in value, the Bourdon spring tends to straighten and in so doing, engages a valve 36 that controls an auxiliary air line 37 which is adapted to operate the valve 18. The auxiliary air line, in which the valve 36 is located, preferably operates at about 25 pounds pressure per square inch and the valve 18 is actuated by the pressure from this auxiliary air line. The remaining portions of the system shown in Fig. 2 correspond to the similarly numbered parts of Fig. 1.

One of the salient advantages of employing a Bourdon spring and auxiliary control for the inflating pressure is the accurate adjustment that may be obtained of the value of pressure at which the valve responds. The Bourdon spring valve mechanism may be adjusted to respond within a few per cent of the same pressure values under all circumstances of operation without impairing the operation of the pressure gauge which the Bourdon spring operates.

Although we have described only two modifications of our invention, it is evident that many modifications may be made in the apparatus without departing from the spirit and scope of our invention and we desire, therefore, that only such limitations shall be imposed as are indicated in the appended claims.

What we claim is:

1. The combination with a steam heated hydraulic vulcanizing press, of means for admitting air to said press to inflate articles contained therein, said means being operably dependent upon the pressure of the hydraulic medium in the press.

2. The combination with a steam heated hydraulic vulcanizing press, of means for admitting air to the articles being vulcanized in the press, and means operably dependent upon the pressure of the air supplied to said articles for admitting steam to the vulcanizing press.

3. The combination with a steam heated hydraulic vulcanizing press, of means for admitting air to said press to inflate articles contained therein, said means being operably dependent upon the pressure of the hydraulic medium in the press, and means operably dependent upon the pressure of the air supplied to said articles for admitting steam to the vulcanizing press.

4. The combination with an hydraulic vulcanizing press, of means for supplying heating fluid to said press, means for supplying pneumatic pressure to the articles being vulcanized in said press, means for supplying hydraulic pressure to operate said press, and means for automatically releasing the pneumatic pressure and the steam pressure upon failure of the hydraulic pressure.

5. The combination with an hydraulic vulcanizing press, of means for supplying heating fluid to said press, means for supplying pneumatic pressure to the articles being vulcanized in said press, means for supplying hydraulic pressure to operate said press, and means for automatically arresting the supply of heating fluid to said press upon the failure of the pneumatic pressure supplied thereto.

6. The combination with an hydraulic vulcanizing press, of means for supplying heating fluid to said press, means for supplying pneumatic pressure to the articles being vulcanized in said press, means for supplying hydraulic pressure to operate said press, and means for automatically arresting the supply of heating fluid to said press upon the failure of either the pneumatic or hydraulic pressure supplied thereto.

7. The combination with an hydraulic vulcanizing press, of means for supplying heating fluid to said press, means for supplying pneumatic pressure to the articles being vulcanized in said press, means for supplying hydraulic pressure to operate said press, and means for automatically arresting the supply of heating fluid to said press upon the failure of the pneumatic pressure supplied thereto, said last named means being adapted to automatically reestablish the supply of heating fluid when the air pressure is reestablished.

8. The combination with a vulcanizing apparatus of the character described, of means for supplying hydraulic pressure to said apparatus for operating said apparatus; means for supplying pneumatic pressure to said apparatus controlled by said hydraulic pressure means; and means for supplying heat fluid pressure to said apparatus that is concurrently and dependently responsive to both the hydraulic pressure means and said pneumatic pressure.

9. The combination with a vulcanizing apparatus comprising a heating chamber, an hydraulic ram, and means for supplying pneumatic pressure to articles being vulcanized within said chamber, of means for supplying hydraulic pressure to said ram, said pneumatic pressure supplying means controlled by the hydraulic pressure supplied to said ram, and means responsive to the pneumatic and the hydraulic pressure for supplying heating fluid to said heating chamber.

In witness whereof we have hereunto signed our names in the presence of two subscribing witnesses.

KARL B. KILBORN.
WALTER E. SHIVELY.

Witnesses:
R. S. TROGNER,
R. T. HOWES.